J. F. WILKINSON.
UNIVERSAL JOINT.
APPLICATION FILED FEB. 2, 1911.
1,071,377.
Patented Aug. 26, 1913.
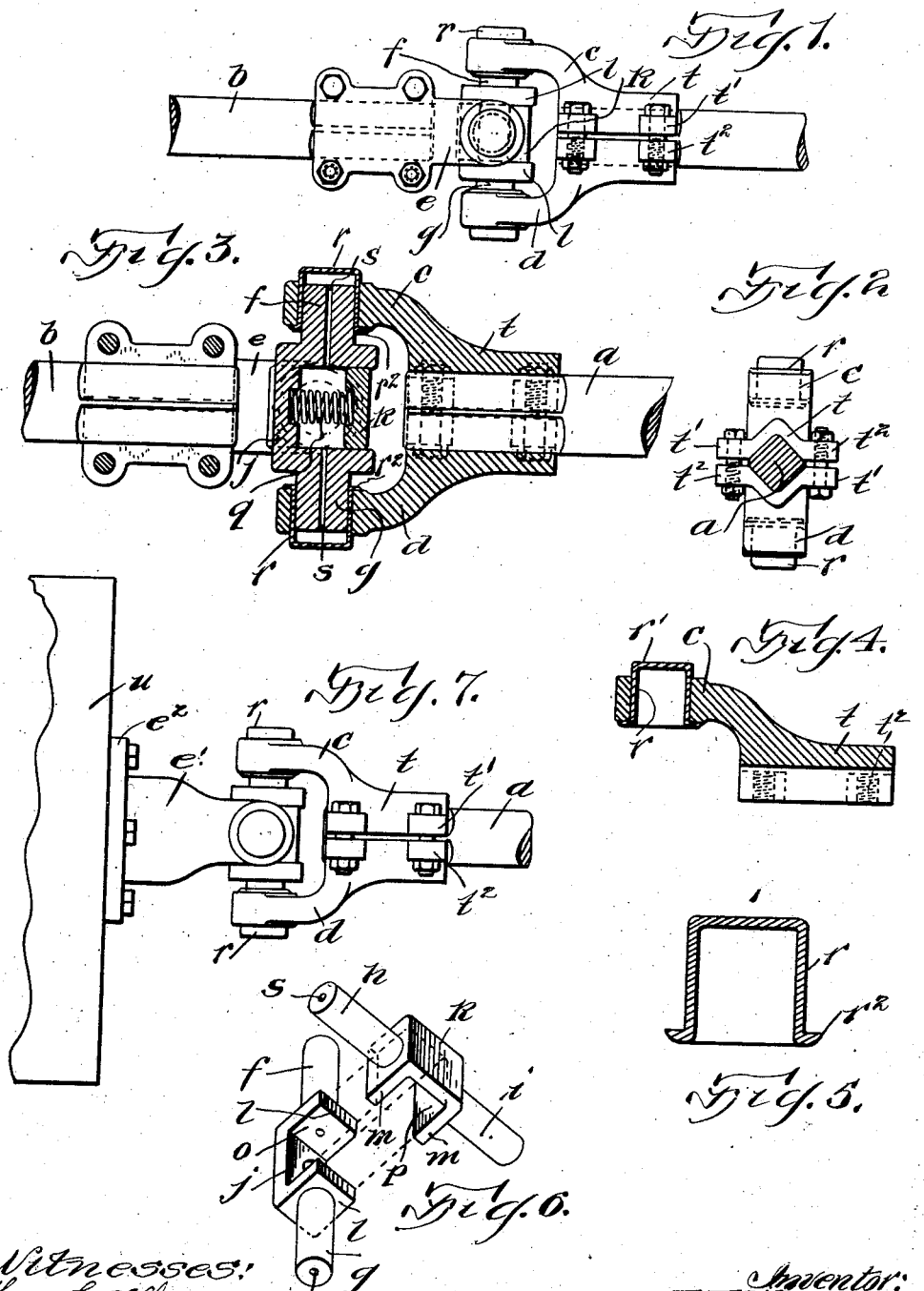

UNITED STATES PATENT OFFICE.

JOHN F. WILKINSON, OF GLOUCESTER, MASSACHUSETTS.

UNIVERSAL JOINT.

1,071,377.

Specification of Letters Patent.

Patented Aug. 26, 1913.

Application filed February 2, 1911. Serial No. 606,204.

*To all whom it may concern:*

Be it known that I, JOHN F. WILKINSON, of Gloucester, in the county of Essex and State of Massachusetts, have invented certain new and useful Improvements in Universal Joints, of which the following is a specification.

This invention relates to machine elements of the kind known as universal joints, the purpose of which is to transmit rotary movement from one shaft to another when the shafts are inclined to one another, as well as when they are in alinement.

The object of the present invention is to provide a joint capable of transmitting such motion not only when the shafts are at an angle, but also when their axes, if prolonged, will not intersect and when the center of the coupling member is not in the intersection of the shaft axes. In other words my object is to enable motion to be transmitted without binding and with perfect freedom by the joint in case one shaft as a whole should be at one side of its proper position, and also in case the shafts should be displaced endwise from their proper positions.

The second object is to make a joint of such construction that relative endwise movement of the shafts toward or from one another may be permitted within limits, without causing excessive friction on the parts of the joints or otherwise causing difficulty.

Other objects of a minor nature are accomplished by my invention, but these objects will appear fully in the detailed description contained in the following specification.

In the drawings, Figure 1 represents an elevation of my novel universal joint represented as coupling two shaft sections together. Fig. 2 is an end elevation of the same. Fig. 3 is a longitudinal section of the joint. Fig. 4 is a sectional view of one part of one of the forks of the coupling. Fig. 5 is a sectional detail view showing a bearing bushing for one of the trunnions of the center block. Fig. 6 is a perspective view showing the two parts of which the center block of the joint is composed, separated. Fig. 7 is an elevation showing a modification of the invention and illustrating the manner of applying the same to other machine elements than a shaft.

The same reference characters indicate the same parts in all the figures.

In universal joints as constructed prior to my invention, the center block or center piece has been confined closely between the arms of the forks which are applied to the shaft sections or other rotating elements to be coupled by the joint. As a result it is necessary in setting up the shafts and other parts to make sure that the axes about which they rotate are in exactly the same plane, because if they are in different planes and their prolongations do not intersect, the arms of one of the forks will be eccentric to the other fork and will bear alternately with more or less severe pressure against the center block and cause the trunnions of the center block to bind in the bearings of the second fork. Again in setting up such a joint, it is essential that the center of the center block should be exactly in the point of intersection of the axes of the shafts or other rotating parts, because if the shafts are moved endwise with the joint so that the center block is carried beyond the intersection, it will be eccentric to one of the shafts and will therefore bear unevenly upon the arms of the forks causing its trunnions to bind and act against excessive friction.

In my invention I have devised a joint or coupling the use of which enables the shafts or other elements to be out of line and in different planes, and permits them to be shifted endwise until the center of the joint is comparatively far to one side or the other of the point of intersection or of approximate intersection, without causing the trunnions of the joint to bind, and in fact without making the least increased difficulty of turning. Also by the improved joint I have provided latitude for a certain amount of relative end movement of the two shaft sections or other elements and of the parts of the joint which are secured to such elements, without imposing burdens upon the joint.

In the drawings $a$ and $b$ represent two sections or pieces of shafting coupled together by a universal joint. The joint consists of forks attached to the ends of the shaft sections and each having two arms. One of the forks has the arms $c$, $d$, and the other has corresponding arms, one only of which is shown and is represented by $e$. The center block, in so far as one aspect of the invention is concerned, may be a solid piece having two pairs of outwardly extending trunnions at right angles to each other, but as respects another aspect of the invention, is made in two parts and is so shown in the drawings herein. One of the parts has two trunnions $f$ and $g$ which are contained rotatively in the arms $c$, $d$, and the other part has similar trunnions $h$, $i$, contained in the arms of the other fork. The two parts of the center block are recessed centrally so that they may be mortised together, thus enabling the parts to be so assembled that the trunnions are all in the same zone or plane and are at right angles to one another.

The parts of the center block are shown in Fig. 6, from which it will be seen that each part consists of the oppositely extending trunnions and a connecting portion $j$, $k$, respectively, flanked by jaws $l$ and $m$. Between the jaws $l$ of the one piece is a recess $o$ and between the jaws $m$ of the other piece is a recess $p$. In assembling the parts of the center block they are placed so that the jaws $l$ of one embrace the connecting web $k$ of the other, while the jaws $m$ of the second embrace the connecting web or part $j$ of the first. The recesses $o$ and $p$ form a chamber of considerable width sufficient to permit an axial play of one part relatively to the other. In the chamber is placed a spring $q$ which tends to separate the parts. The ends of this spring are retained in recesses in the webs $j$ and $k$.

In assembling the parts of the joint the center block is turned in such a way that the web $j$ of one part and the spring $q$ are interposed between the web $k$ of the other part and the crotch of the fork into which the second part is held. Or in other words the web $j$ with the trunnions $f$, $g$ and the arms $c$, $d$ close in the space in which the web $k$ is contained, so that no amount of relative movement of one shaft away from the other will disconnect the parts of the joint, but such movement apart will be resisted by the entire strength of the central part. When power is transmitted from one shaft section to the other the jaws of one half of the center block bear on the connecting web of the other half of the block and transmit rotation while permitting play between the shafts.

It will be noted from Figs. 1 and 3, particularly the latter, that the distance between the arms of the forks is greater than the length of the connecting portion between the trunnions, and that thus latitude for play of the entire center block between the arms $c$ and $d$ of the fork is permitted. The same is true of the arms $e$ of the second fork. Thus it is possible to offset one of the shafts bodily in any direction within the limits of the play thus provided for and as a consequence of such offsetting the center block in its rotation will vibrate from one arm to the other of the fork or conversely the arms of the fork will alternately approach and recede from the middle portion of the center block. This will occur smoothly and without in the least increasing the frictional resistance of the joint as a whole. This is a feature of which the importance cannot be exaggerated, because it enables excessive care in the setting up of shafts and couplings to be dispensed with. Hitherto in setting up fixed shafts or other elements to be coupled by a universal joint, it has been necessary to use the greatest care in insuring that shafts are in the same plane and that the prolongations of their axes actually intersect, and, in the case of finely fitted machinery, accuracy within a very few thousandths of an inch has been required. As the result of my invention, however, no accuracy in this regard is necessary provided only that either shaft is not displaced by an excessive amount, since any displacement within one sixteenth of an inch, an amount which could hardly be exceeded except purposely, is within a safe limit.

One particular application to which this joint is especially adapted is in connecting the shafting and engine of boats, where disalinement of the bearings and shafting is apt to occur in consequence of the hull of the boat settling. It is useful also in every place where there is danger or likelihood of shafts getting out of the same plane.

As a desirable bearing for each trunnion in its corresponding fork arm I provide a bushing $r$ in the form of a cap having a cylindrical wall fitting the trunnion and an end wall $r'$ extending across the end of the trunnion. The bushing also has a flange $r^2$ underlying and bearing against the inner side of the arm, to prevent the bushing being displaced outwardly by centrifugal force or otherwise. The end wall of the bushing is of use to retain oil, which may be supplied to the center block in the cavity or chamber thereof between the two parts, from which chamber it is fed to the bearings through longitudinal passages $s$ in the trunnions. The oil issuing from these passages is confined by the end walls of the bushings and is caused to lubricate the bearing surfaces of the trunnions and bushings.

Each part of the center block is made in one piece, the trunnions of such piece being inseparable and incapable of contraction. Hence in order to assemble the parts of the joint together the forks are divided longitudinally between the arms thereof, each fork thus being made in two parts, each part of which carries one of the arms. The members of the forks have semihub portions $t$ equipped with flanges $t'$ and $t^2$ by which they may be clamped upon the end of the shaft with bolts and nuts. The two halves of the fork are exact counterparts of each other so that they are interchangeable and one pattern serves for all. The flange $t'$ of each is provided with a plain hole to receive the shank of the coupling bolt, and the flange $t^2$ with a tapped hole to contain the threaded part of the bolt. From Fig. 2 it will be seen that the two parts of the fork are so arranged that the tapped flange $t^2$ comes opposite to the flange $t'$ in which the plain hole is formed in the other. As a result of the divided formation of the forks, the two parts thereof can be assembled upon the opposite trunnions of one half of the center block and may then be clamped upon the shaft or other element to which they are secured.

The modification shown in Fig. 7 illustrates the manner in which the coupling may be used to connect other rotating elements than shafts. In this form one of the forks is constructed exactly as hereinbefore described and mounted upon a shaft section $a$, while the parts of the other fork $e'$ are provided with flanges $e^2$ capable of attachment to the side of a rotating disk $u$.

Conveniently the hub portions of the forks are made non-circular in outline and the ends of the shaft sections on which they are applied are similarly formed, but this is not of the essence of the invention and any construction or attaching means whereby the forks may be kept from relative rotation upon the shaft sections may be employed.

From the foregoing it will be seen that my improved universal joint permits either shaft to be displaced bodily in any direction transverse to its axis, permits both shafts to be moved simultaneously along their axes, and permits the shafts to be moved relatively toward and from one another, without causing the center block to bind in the forks, and without increasing in the least degree the frictional resistance of the joint to turning.

I claim,—

1. In a universal joint the combination of a pair of forks divided longitudinally into two parts, each part having an arm and being assembled upon shaft sections so that the arms of each pair are opposite to each other, and intermediate those of the other pair, a center piece consisting of two parts, each part having diametrically-opposite trunnions contained in the arms of one fork, a connecting web and jaws at the ends of said web and at the bases of the trunnions, the jaws of one piece embracing the web of the other whereby the two pairs of trunnions are held at right angles to each other and relative movement of the parts of the center block is permitted, while rotary movement is transmitted from one part to the other through the jaws, and a spring interposed between the webs of the two parts tending to push them apart and permitting them to be drawn together in consequence of relative endwise movement of the shaft sections.

2. In a universal joint the combination of a pair of forks divided longitudinally into two parts, each part having an arm and being assembled upon shaft sections so that the arms of each pair are opposite to each other, and intermediate those of the other pair, a center piece consisting of two parts, each part having diametrically opposite trunnions contained in the arms of one fork, a connecting web and jaws at the ends of said web and at the bases of the trunnions, the jaws of one piece embracing the web of the other whereby the two pairs of trunnions are held at right angles to each other and relative movement of the parts of the center block is permitted, while rotary movement is transmitted from one part to the other through the jaws.

In testimony whereof I have affixed my signature, in presence of two witnesses.

JOHN F. WILKINSON.

Witnesses:
 ARTHUR H. BROWN,
 P. W. PEZZETTI.